April 10, 1934.    W. A. SMITH    1,954,270
PRINTER'S FEED GAUGE
Filed Nov. 20, 1931
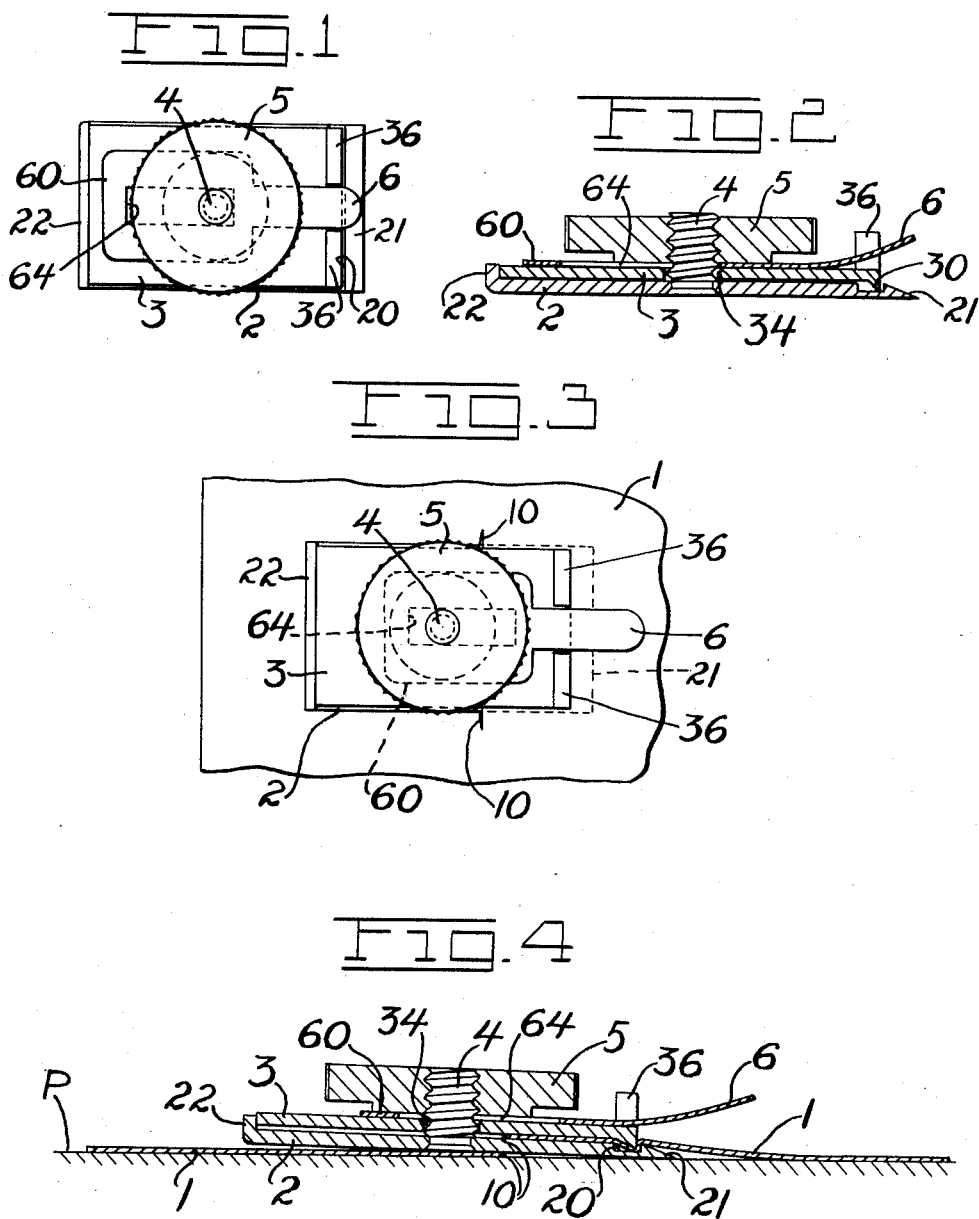

Patented Apr. 10, 1934

1,954,270

UNITED STATES PATENT OFFICE 1,954,270

PRINTER'S FEED GAUGE

Warner A. Smith, Seattle, Wash., assignor of one-half to Percy S. Moore, Seattle, Wash., and one-half to himself Application November 20, 1931, Serial No. 576,297

4 Claims. (Cl. 101—415)

My invention relates to printer's feed gauges, these being in the nature of small clamps to be secured upon an edge of a tympan sheet as a guide against which to position the sheets to be printed, so that the type may properly register therewith.

It is an object of my invention to devise a gauge which can be more securely gripped upon an edge of the tympan sheet than other gauges with which I am familiar, and one in which the tendency to tear the tympan sheet, such as occurs with long continued use, is lessened, so that with these advantages the gauge will remain exactly as originally positioned, over a considerable period of use.

It is a further object to provide such a gauge clamping on in the manner indicated which will eliminate any tendency for the work sheet to be caught by or to slip beneath any portion of the gauge, thus preventing damage to the work sheet and enabling it to be lifted immediately from the platen.

A further object is the provision of a feed gauge of this character which is simple in construction, easy to apply, and which requires but one clamping screw and nut.

It is a further object to provide a projecting tongue for use with such a gauge which is adjustable for varying projections, and which cannot readily be separated from the gauge itself and thereby become lost.

My invention comprises other objects which will become apparent from a study of the attached drawing, wherein my invention is shown in a form at present preferred by me, of this specification and the claims which terminate the same.

My invention comprises the novel parts and the novel combination and arrangement thereof, as shown in the accompanying drawing, described in the specification, and defined in the claims.

Figure 1 is a plan view of the gauge, and Figure 2 is a longitudinal vertical section therethrough on an enlarged scale.

Figure 3 is a plan view of the gauge applied to a tympan sheet, and Figure 4 is a longitudinal vertical section through the same attached in position of use.

The tympan sheet 1 is made of extremely tough material, and the gauge may be clamped upon its extreme edge, or, as is customary, upon the edge of a slit 10, inward from the sheet's edge. My gauge is so designed that the slit is made parallel to the edge of the gauge and the work sheet, since it has been found that this lessens the tendency to tear out.

The gauge itself comprises a lower plate 2, an upper plate 3, and a means to draw them together—for instance, the bolt 4 upstanding from the lower plate 2 and passing through a perforation 34 in the upper plate, and the flat nut 5 threaded on this bolt and pressing the upper plate down upon the lower one. I prefer that only a single bolt and nut be employed, since this facilitates the attachment and detachment of the gauge and its ready adjustment to exact position.

The lower plate at its inner end—that is, the end which is to underlie the edge of the tympan sheet 1—is grooved as indicated at 20, and the edge of this groove, adjacent the end of the plate, preferably is substantially perpendicular to the upper surface of the plate. In a position to match with and fit within this groove, when the plates are in operative position, the upper plate 3 is provided with a rib 30 projecting downwardly below its under surface. I prefer that this be located at the extreme end of the upper plate 3 and that its extreme face be substantially perpendicular to the surfaces of the plate 3, so that when the aperture 34 of the plate 3, closely embracing the bolt 4, positions the rib 30 within the groove 20, the two surfaces will be substantially parallel, though perhaps spaced by something less than the thickness of the tympan paper.

The rib 30, when thus engaged, extends below the upper edge of the groove 20, and the tympan paper is sharply bent, as may be seen in Figure 4; thus there is produced two types of grip—the edge grip of the sharp rib 30 pressed down to the bottom of the groove 20 by the pressure of the nut 5, and the squeezing action of the end face of the rib pressing down alongside of the perpendicular face of the groove with the tympan paper interposed between them. The result is a very firm, strong grip, one that will not, under any stress of normal operation, pull out or be displaced, and one which will not tend to tear the tympan paper.

I prefer that this inner end of the lower plate 2 be beveled off, as indicated at 21, from the upper edge of the groove to the end of the plate, so that the tympan sheet may lie close to the platen surface which is indicated at P in Figure 4, and so that its surface will slope slightly upward all the way to the rib 30, where it will bend sharply downward.

Since I prefer to use but the single bolt 4, there might be a tendency for the upper plate 3, upon rotation of the nut, to rotate relative to the lower plate 2, and to prevent this various means may be employed. For example, as a cheap and convenient way of accomplishing the desired end, the end of the plate 2 opposite the groove may be upturned to provide a flange 22, which will engage the corresponding end surface of the upper plate 3, or vice versa. This provides two transversely extending surfaces which interengage, thereby preventing rotation of one plate relative to the other. This interengagement of the end of plate 3 with the flange 22 exactly positions the rib 30 within the groove 20, spaced the proper distance from the wall of the groove to grip the tympan paper, quite independently of the location of the bolt 4, and regardless of any slight inaccuracy in the latter's location, or of wear thereof.

It is customary to employ a tongue overlying the position of the work sheet to prevent its edge curling up and in that way failing to register with the gauge. Such a tongue is indicated at 6, and it may have a body 60 which lies between the nut 5 and the upper plate 3, to be clamped in position by the nut. This body 60 is apertured to embrace the bolt 4, and preferably this aperture 64 is elongated so that the tongue may be projected more or less beyond the end of the plate 3. To maintain the tongue in position, upstanding fingers 36 may be provided at the ribbed end of the plate 3, these fingers being spaced to embrace the projecting tongue. Preferably they are so positioned that they come flush with this end of the plate 3 and its rib 30.

Because the rib 30 extends below the upper surface of the plate 2, and because it projects sharply downward below the surface of the tympan sheet which is gripped, there is no tendency for the work sheet to slide beneath it, and no possibility because of the tight squeezing of the tympan sheet between the side faces of the rib and the groove. All surfaces with which the edge of the work sheet may come in contact are flush—that is to say, the end of the plate 3, the side face of its rib 30, and the side faces of the fingers 36.

The device, because it has but one nut, is quickly and easily clamped in place and adjusted to exact position. Once in place it holds until the tympan sheet gives way, and because of the location of the slit, there is a sufficient width of the tympan paper between the edge of the slit and the gripping point that tearing is extremely unlikely. The work sheet, as has been noted, cannot be caught by the gauge, and when the tongue 6 is employed there is little likelihood of the work sheet failing to come to exact registry with each one of the several gauges usually employed.

What I claim as my invention is:

1. A printer's feed gauge for attachment to a tympan sheet comprising an upper and a lower plate and means to draw them together, one plate having a groove with a side wall perpendicular to the plate's surface, and the other having a rib with a side matching the perpendicular wall of the groove, and in operative position extending below the edge of the groove, and when the plates are held by the said means said two walls being spaced somewhat less than the normal thickness of the tympan paper, whereby as the plates are drawn together the tympan paper is bent sharply and squeezed between these two walls.

2. A printer's feed gauge for securement to an edge of a tympan sheet comprising a lower plate transversely grooved near one end, this end adapted to underlie the tympan sheet, a single bolt projecting upward from the lower plate outwardly of the groove, an upper plate overlying the lower plate and the edge of the tympan sheet, and apertured to fit over and be positioned by said bolt, a transverse rib at its end extending below its lower surface to engage within the groove, a nut received on the bolt to clamp the tympan sheet between the rib and the groove, and transversely extending interengaging surfaces on the two plates to prevent rotation of one relative to the other, and to position the rib of one for engagement within the groove of the other.

3. A printer's feed gauge for securement to an edge of a tympan sheet comprising a lower plate transversely grooved near one end, this end adapted to underlie the tympan sheet, a single bolt projecting upward from the lower plate outwardly of the groove, an upper plate overlying the lower plate and the edge of the tympan sheet, and apertured to fit over and be positioned by said bolt, a transverse rib at its end extending below its lower surface to engage within the groove, a nut received on the bolt to clamp the tympan sheet between the rib and the groove, and a flange upstanding at the opposite end of the lower plate, and constantly engaging the corresponding end of the upper plate to prevent rotation of one relative to the other, and to position the rib of one plate for engagement within the groove of the other, at a predetermined distance from a vertical wall of the groove.

4. A gauge as in claim 1, a single bolt disposed in the lower plate and received in an aperture in the upper plate, and a clamping nut thereon, constituting the means to draw the plates together, and serving to maintain the walls of the rib and groove in properly spaced relationship, as defined in claim 1, and transversely extending interengaging surfaces on the two plates to prevent rotation of one relative to the other, and further serving to maintain the spacing between the walls of the rib and groove throughout the length of the latter.

WARNER A. SMITH.